US011034536B2

(12) United States Patent
Hoffman et al.

(10) Patent No.: US 11,034,536 B2
(45) Date of Patent: Jun. 15, 2021

(54) CARD FLIPPER

(71) Applicant: Assa Abloy AB, Stockholm (SE)

(72) Inventors: Ted M. Hoffman, Eden Prairie, MN (US); Tanya Snyder, Edina, MN (US); John Skoglund, Prior Lake, MN (US); Phillip Umberger, Jordan, MN (US); Evan Pastor, Edina, MN (US)

(73) Assignee: ASSA ABLOY AB, Stockholm (SE)

( * ) Notice: Subject to any disclaimer, the term of this patent is extended or adjusted under 35 U.S.C. 154(b) by 90 days.

(21) Appl. No.: 16/265,272

(22) Filed: Feb. 1, 2019

(65) Prior Publication Data

US 2020/0247633 A1 Aug. 6, 2020

(51) Int. Cl.
| | |
|---|---|
| *B65H 15/00* | (2006.01) |
| *B23K 26/362* | (2014.01) |
| *B32B 37/18* | (2006.01) |
| *B32B 38/00* | (2006.01) |
| *B65H 5/06* | (2006.01) |

(52) U.S. Cl.
CPC .......... *B65H 15/00* (2013.01); *B23K 26/362* (2013.01); *B32B 37/18* (2013.01); *B32B 38/0008* (2013.01); *B65H 5/062* (2013.01); *B32B 2425/00* (2013.01)

(58) Field of Classification Search
CPC ...... B65H 5/062; B65H 15/00; B65H 15/016; B65H 2301/332; B65H 2301/33222
See application file for complete search history.

(56) References Cited

U.S. PATENT DOCUMENTS

| | | | |
|---|---|---|---|
| 4,015,724 A | 4/1977 | Spencer | |
| 5,600,362 A * | 2/1997 | Morgavi | B65H 15/00 347/218 |
| 5,709,484 A | 1/1998 | Dorner | |
| 5,771,058 A | 6/1998 | Kobayashi | |
| 5,927,713 A | 7/1999 | Driscoll et al. | |
| 5,941,522 A | 8/1999 | Hagstrom et al. | |
| 6,011,948 A | 1/2000 | Amano et al. | |
| 6,279,901 B1 | 8/2001 | Fulmer | |

(Continued)

FOREIGN PATENT DOCUMENTS

| | | |
|---|---|---|
| CH | 637900 A5 | 8/1983 |
| CN | 1930003 | 3/2007 |

(Continued)

OTHER PUBLICATIONS

"European Application Serial No. 20154264.4, Extended European Search Report dated Jul. 7, 2020", 9 pgs.

(Continued)

*Primary Examiner* — Philip C Tucker
*Assistant Examiner* — John Blades
(74) *Attorney, Agent, or Firm* — Schwegman Lundberg & Woessner, P.A.

(57) ABSTRACT

A card flipper includes a frame, a receptacle, and a motor. The receptacle is supported by the frame for a rotation about a flipping axis. The receptacle is configured to support a card in a support plane and receive and discharge cards along a card feed axis. The motor is configured to drive rotation of the receptacle, the support plane and the card feed axis about the flipping axis. The flipping axis is oblique to the card feed axis and is displaced from the support plane.

19 Claims, 11 Drawing Sheets

(56) References Cited

U.S. PATENT DOCUMENTS

| | | | |
|---|---|---|---|
| 6,402,136 B1 * | 6/2002 | Lamothe | B65H 15/00 242/615.21 |
| 6,722,649 B2 | 4/2004 | Yui | |
| 7,328,897 B2 | 2/2008 | Bryant et al. | |
| 7,870,824 B2 | 1/2011 | Helma et al. | |
| 8,196,921 B1 | 6/2012 | Opfer et al. | |
| 8,523,167 B2 * | 9/2013 | Ponti | B65H 39/06 271/3.14 |
| 8,646,770 B2 | 2/2014 | Meier et al. | |
| 8,721,205 B2 | 5/2014 | Francis et al. | |
| 8,876,110 B2 | 11/2014 | Hoffman et al. | |
| 9,679,229 B2 | 6/2017 | Hoffman et al. | |
| 2005/0053406 A1 | 3/2005 | Jones et al. | |
| 2005/0104281 A1 | 5/2005 | Stender et al. | |
| 2006/0071420 A1 | 4/2006 | Meier et al. | |
| 2007/0099462 A1 | 5/2007 | Helma et al. | |
| 2008/0068432 A1 | 3/2008 | Sohn et al. | |
| 2008/0124163 A1 | 5/2008 | Morimoto et al. | |
| 2012/0177474 A1 | 7/2012 | Meier et al. | |
| 2013/0220984 A1 | 8/2013 | Cronin et al. | |
| 2018/0111396 A1 | 4/2018 | Aihara et al. | |

FOREIGN PATENT DOCUMENTS

| | | |
|---|---|---|
| CN | 202897588 | 4/2013 |
| CN | 203740671 | 7/2014 |
| CN | 104827784 | 8/2015 |
| CN | 205061044 | 3/2016 |
| CN | 105565016 | 5/2016 |
| CN | 205204160 | 5/2016 |
| CN | 105565016 | 12/2017 |
| DE | 10219569 A1 | 11/2003 |
| EP | 0846639 B1 | 9/2002 |
| EP | 3689800 | 8/2020 |
| FR | 1555892 | 1/1969 |
| JP | 60258037 | 12/1985 |
| JP | 2011104935 | 6/2011 |
| JP | 5405987 | 11/2013 |
| JP | 2018043807 | 3/2018 |
| JP | 2018065676 | 4/2018 |

OTHER PUBLICATIONS

"Chinese Application Serial No. 202010079184.0, Office Action dated Mar. 16, 2021", w/ English Translation, 11 pgs.

"European Application Serial No. 20154264.4, Response filed Dec. 28, 2020 to Extended European Search Report dated Jul. 7, 2020", 57 pages.

\* cited by examiner

CARD FLIPPER

FIELD

Embodiments of the present disclosure relate to a card flipper that inverts card substrates about an axis that is oblique to a card feed axis of the card flipper.

BACKGROUND

Card products include, for example, credit cards, identification cards, driver's licenses, passports, and other card products. Such card products generally include printed information, such as a photo, account numbers, identification numbers, and other personal information. Credentials can also include data that is encoded in a smartcard chip, a magnetic stripe, or a barcode, for example.

Card production systems include processing devices that process card substrates (hereinafter "cards") to form the final card product. Such processes may include a printing process, a laminating or transfer process, a data reading process, a data writing process, and/or other process used to form the desired credential.

Credential production systems typically include a card supply for supplying individual cards to the card processing devices, and a collection unit, such as a hopper or other container, for collecting the processed card products. The card supply generally feeds individual cards from a card stack to the processing devices for processing. For large card production systems, it may be desirable to utilize multiple card supplies to provide a large supply of cards including different card types to the card processing devices.

SUMMARY

Embodiments of the present disclosure are directed to a card flipper, a card flipper module that includes the card flipper, and a card production system that includes one or more of the card flipper modules. In some embodiments, the modules are configured to supply cards in a card production system, and the card flipper allows the modules to be placed in a side-by-side arrangement to facilitate expansion of the card processing capability of the system.

One embodiment of the card flipper includes a frame, a receptacle, and a motor. The receptacle is supported by the frame for a rotation about a flipping axis. The receptacle is configured to support a card in a support plane and receive and discharge cards along a card feed axis. The motor is configured to drive rotation of the receptacle, the support plane and the card feed axis about the flipping axis. The flipping axis is oblique to the card feed axis and is displaced from the support plane.

One embodiment of the flipper module includes a frame, a card supply configured to hold a stack of cards, a card flipper, and a card transport. The card flipper includes a receptacle supported by the frame for rotation about a flipping axis. The receptacle is configured to support a card in a support plane and receive and discharge cards along a card feed axis. The motor is configured to drive rotation of the receptacle, the support plane, and the card feed axis about the flipping axis. The flipping axis is oblique to the card feed axis and is displaced from the support plane. The card transport is configured to feed individual cards from the card supply to the receptacle of the card flipper.

One embodiment of the card production system includes a processing module and first and second card flipper modules. The processing module includes at least one processing device and a card input. The at least one processing device includes a print unit configured to print an image on a card, a laminating unit configured to apply an overlaminate to a card, and/or a laser engraving unit configured to engrave a card. The card input is configured to receive individual cards for processing by the at least one processing device along an input feed path. The first and second flipper modules each include a frame, a card supply configured to hold a stack of cards, a transport configured to feed individual cards from the card supply along a transport feed path, which is oblique to the input feed path, and a flipper configured to receive a card fed along the first transport feed path, invert the card and discharge the card along the input feed path to the processing module. The first card flipper module is between the processing module and the second card flipping module. The flipper of the second card flipper module is configured to discharge a card to the flipper of the first flipper module.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the Background.

DETAILED DESCRIPTION OF ILLUSTRATIVE EMBODIMENTS

Figure 1:
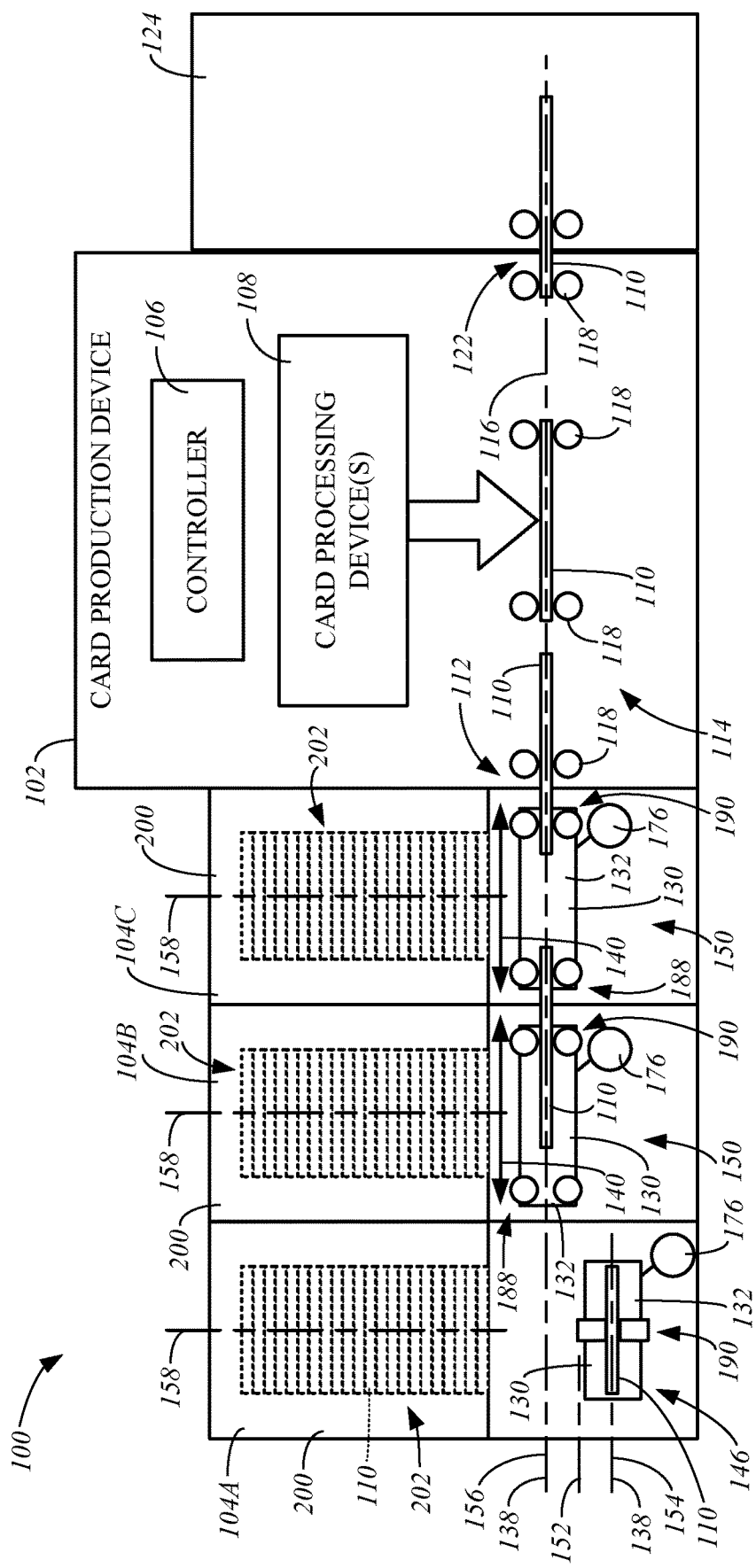
FIGS. 1 and 2 are front and top simplified views of a card production system that includes a card production device and one or more card flipper modules, in accordance with embodiments of the present disclosure.

Embodiments of the present disclosure are directed to a card flipper, a card flipper module that includes the card flipper, and a card production system that includes one or more of the card flipper modules. These and other embodiments of the present disclosure are described more fully hereinafter with reference to the accompanying drawings.

Elements that are identified using the same or similar reference characters refer to the same or similar elements. The various embodiments of the present disclosure may, however, be embodied in many different forms and should not be construed as limited to the embodiments set forth herein. Rather, these embodiments are provided so that this disclosure will be thorough and complete, and will fully convey the scope of the present disclosure to those skilled in the art.

Figure 2:
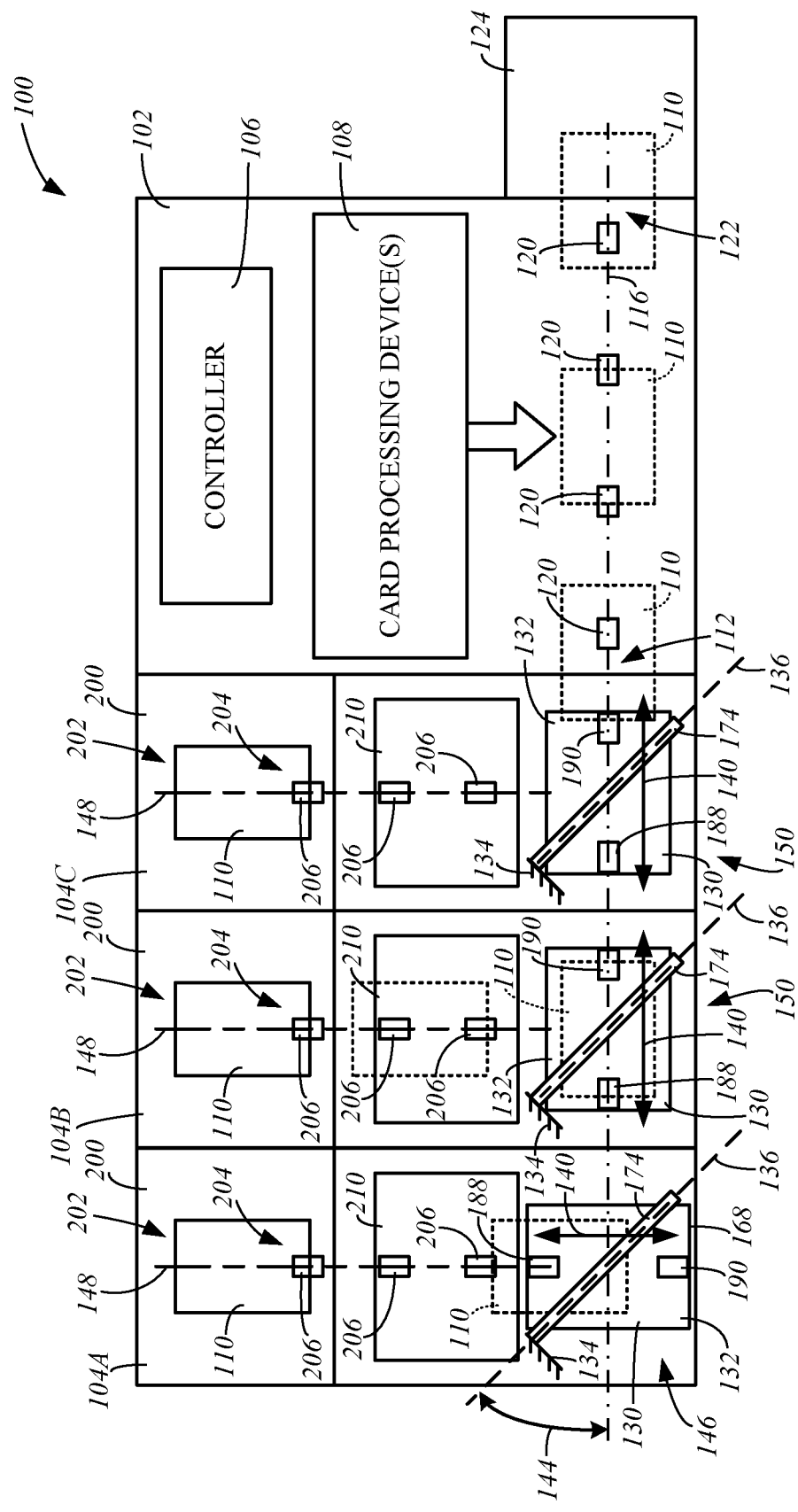

FIGS. 1 and 2 respectively are front and top simplified views of a card production system 100 that includes a card production device 102 and one or more card flipper modules 104, such as 104A-C, formed in accordance with embodiments of the present disclosure. While the system 100 is shown as including three card flipper modules 104, it is understood that embodiments of the present disclosure include systems having a single flipper module 104, or two or more flipper modules 104.

The system 100 may include a controller 106 and one or more card processing devices 108. The controller 106 represents one or more distinct controllers of the system, each of which includes at least one processor that is configured to execute program instructions stored in a computer-readable media or memory of the device, which may also be represented by the controller 106, or another location. Any suitable patent subject matter eligible computer readable media or memory may be utilized including, for example, hard disks, CD-ROMS, optical storage devices, flash memory, magnetic storage devices, or other suitable computer readable media or memory that do not include transitory waves or signals. The execution of the instructions by the controller 106 controls components of the system 100 to perform functions and method steps described herein. The one or more card processing devices 108 are each configured to perform a process on a card substrate 110 (hereinafter card). The card processing devices 108 may include conventional card processing devices, such as a printing device configured to print an image to a surface of the card 110 through a direct or transfer printing process, a laminating device configured to apply an overlaminate to a surface of the card 110, a data reading and/or writing device (e.g., a chip encoder, a magnetic stripe encoder, a radio frequency (RF) encoder, etc.) configured to read data from, and/or write data to, the card 110, and/or another conventional card processing device.

In some embodiments, the one or more flipper modules 104 are each configured to deliver individual cards 110 to the card production device 102. The card production device 102 receives the individual cards 110 through an input 112, as shown in FIG. 1. A transport mechanism 114 feeds the individual cards 110 along an input feed path 116 to the one or more card processing devices 108. The transport mechanism 114 may include conventional motorized pinch roller pairs 120, as shown in FIG. 1, or other suitable card transport mechanisms. After processing, the card 110 may be fed along the input feed path 116 and discharged through an output 122 for collection by a card collection system 124, such as a card hopper.

Each of the card flipper modules 104 includes a card flipper 130 that is configured to invert individual cards 110 and supply the individual cards 110 to the card production device 102 along the input feed path 116. The card flipper 130 includes a receptacle 132 that is supported by a frame 134 of the card flipper module 104 for rotation about a flipping axis 136 (FIG. 2). The receptacle 132 is configured to support an individual card 110 in a card support plane 138 having a fixed orientation relative to the receptacle 132. That is, the card support plane 138 extends through, and is parallel to the plane of the card 110.

A card 110 supported in the receptacle 132 rotates about the flipping axis 136 in the support plane 138 with the rotation of the receptacle 132. In some embodiments, a vertical position of the card support plane 138 of each receptacle 132 changes with rotation of the receptacle about the flipping axis 136. Thus, when the receptacle 132 of the module 104A is in one angular position about its flipping axis 136, the corresponding card support plane 138 (dashed line extending through the receptacle) may be positioned below the card support planes 138 the receptacles 132 of the modules 104B and 104C (dashed line extending through the receptacles) having a different angular position about their flipping axes 136, as indicated in FIG. 2.

Each of the card flippers 130 is configured to receive and discharge individual cards 110 along a card feed axis 140 (FIG. 2) that is generally parallel to the card support plane 138 and has a fixed orientation relative to the receptacle 132 and the card support plane 138. Any suitable card transport mechanism may be used to facilitate the reception and discharge of individual cards 110 along the card feed axis 140. In some embodiments, the receptacle 132 includes one or more motorized feed rollers, such as feed rollers 142 and 143, that facilitate the reception and discharge cards 110 along the card feed axis 140, as described in greater detail below.

In some embodiments, the flipping axis 136 is oriented at an oblique angle 144 to the card feed axis 140, as shown in FIG. 2. In some embodiments, the angle 144 is approximately 45 degrees (±5 degrees). As a result, rotation of the receptacle 132 about the flipping axis 136 changes the orientation of the card feed axis 140. In some embodiments, the receptacle 132 of each flipper 130 has a first angular position 146 about the flipping axis 136, in which the card feed axis 140 is oriented substantially or approximately parallel to a feed path 148 of the corresponding card flipper module 104, and a second angular position 150, in which the receptacle 132 is oriented such that the card feed axis 140 is substantially or approximately parallel to the input feed path 116. In some embodiments, the first and second angular positions 146 and 150 of the receptacle 132 are separated by approximately 180 degrees. Thus, the receptacle 132 is configured to receive and discharge cards 110 along the feed path 148 when the receptacle 132 is in the first angular position 146, as illustrated by the flipper 130 of the flipping module 104A shown in FIG. 2. Additionally, when the receptacle 132 is in a second angular position 150, the receptacle 132 is configured to receive and discharge cards 110 along the input feed path 116, as illustrated by the flippers 130 of the flipping modules 104B and 104C shown in FIG. 2.

Thus, the receptacle 132 of each flipper 130 may receive a card 110 fed along the first feed path 148 of the corresponding flipper module 104 when it is in the first angular position 146 about the flipping axis 136. The flipper 130 may then rotate the receptacle 132 about the flipping axis 136 to the second angular position 150, which inverts the card 110 and orients the card feed axis 140 with the input feed path 116, which is approximately perpendicular to the first feed path 148. The card 110 may then be discharged from the receptacle 132 along the input feed path 116 for processing by the card production device 102, as generally shown in FIG. 2.

In some embodiments, the flipping axis 136 has a fixed position relative to the frame 134, is parallel to a flipping plane 152, as shown in FIG. 1. In some embodiments, the flipping axis 136 is displaced from the card support planes 138 of the receptacles 132. As a result, when the receptacle 132 is in the first angular position 146, the card support plane 138 of the receptacle 132 is substantially parallel or approximately coplanar to a first feed plane 154, as shown by the receptacle 132 of the flipper module 104A in FIG. 1, and when the receptacle 132 is oriented in the second angular position 150, the card support plane 138 is substantially parallel or approximately coplanar to a second feed plane 156, as indicated by the receptacles 132 of the modules 104B and 104C in FIG. 1. Additionally, the first feed plane 154 is parallel to the and aligned with the feed paths 148 of the modules 104, the second feed plane 156 is parallel to and aligned with the input feed path 116, and the first and second feed planes 154 and 156 are displaced from each other along a vertical axis 158 and are approximately parallel to each other, as shown in FIG. 1. As discussed below in greater detail, the displacement of the first and second feed planes 154 and 156 along the vertical axis 158 allows the flipper modules 104 to independently process cards 110 while simultaneously feeding cards 110 along the input feed path 116 to the card production device 102.

Figure 3:
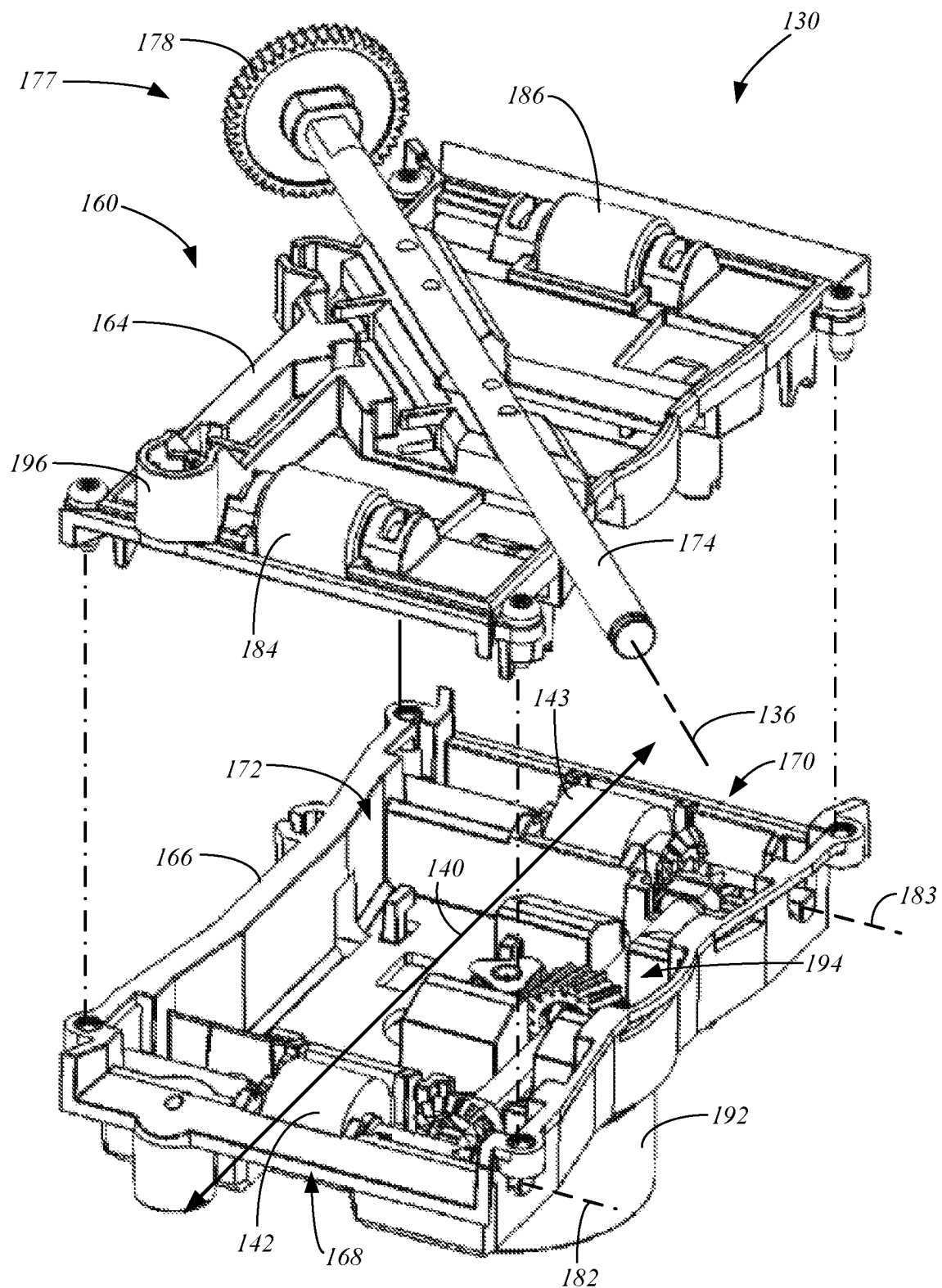
FIG. 3 is an exploded isometric view of a card flipper receptacle in a first angular position, in accordance with embodiments of the present disclosure.
Figure 4:
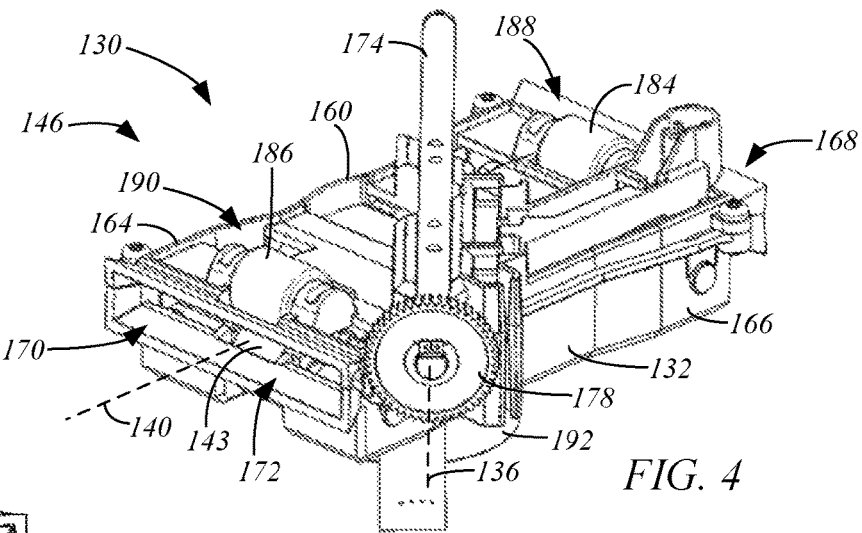
FIGS. 4-6 are assembled isometric views of the card flipper of FIG. 3 respectively in the angular position, an intermediary angular position, and a second angular position, in accordance with embodiments of the present disclosure.
Figure 5:
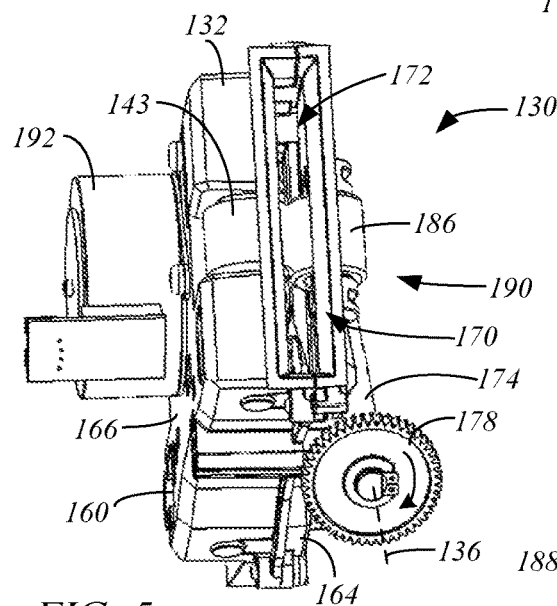
Figure 6:
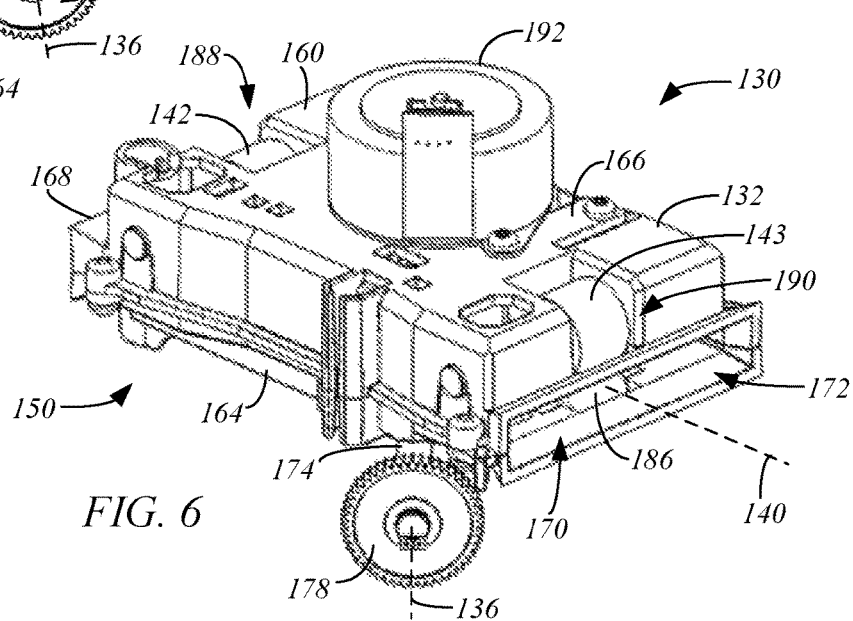
Figure 7:
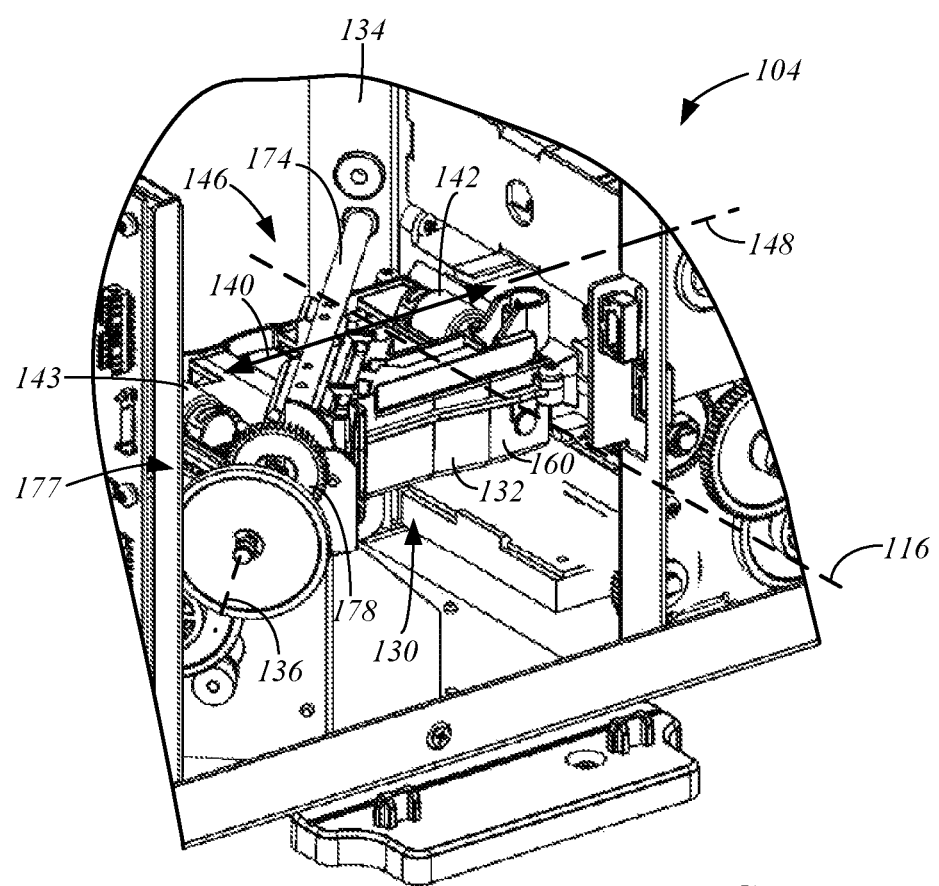
FIGS. 7 and 8 are isometric views of a portion of a flipper module with the card flipper respectively in the first and second angular positions, in accordance with embodiments of the present disclosure.
Figure 8:
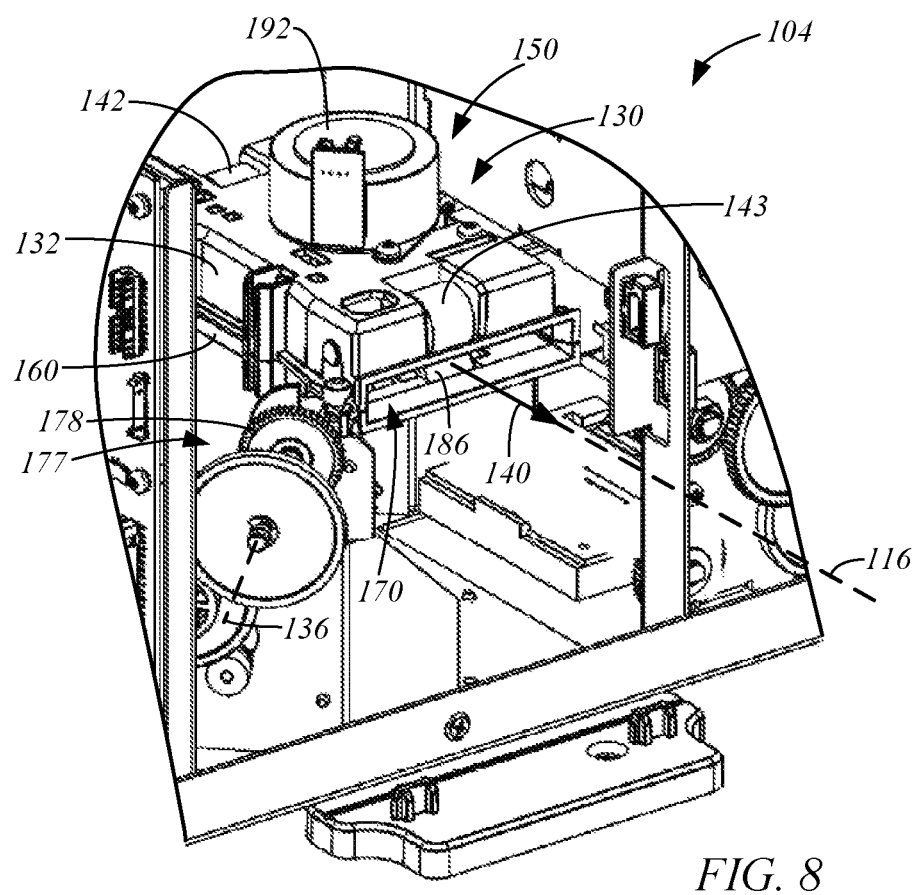

Embodiments of the card flipper 130 will be described with reference to FIGS. 3-8. FIG. 3 is an exploded isometric view of a flipper 130 with the receptacle 132 in the first angular position 146, FIG. 4 is an isometric view of the flipper 130 with the receptacle 132 in the first angular position 146, FIG. 5 is an isometric view of the flipper 130 with the receptacle 132 in an intermediary angular position about the flipping axis 136, FIG. 6 is an isometric view of the flipper 130 with the receptacle 132 in the second angular position 150, and FIGS. 7 and 8 are isometric views of a portion of a module 104 with the flipper respectively in the first and second angular positions 146 and 150.

In some embodiments, the receptacle 132 includes a receptacle frame or housing 160, which may be divided between first and second members 164 and 166 that are exploded from each other in FIG. 3. The housing 160 may include a first port 168 and a second port 170, which are displaced from each other along the card feed axis 140 and define an opening to an interior cavity 172 of the housing formed between the first and second members 164 and 166, in which a card 110 may be supported.

The first member 164 may be attached to a shaft 174 that is configured to rotate about the flipping axis 136, such that the first receptacle 132 rotates about the flipping axis 136 with rotation of the shaft 174. The shaft 174 may be mechanically coupled to a motor 176 (FIG. 1) that drives rotation of the shaft 174 and the attached receptacle 132 about the flipping axis 136. In some embodiments, the motor 176 is not supported by the receptacle 132 and does not rotate with rotation of the receptacle 132 about the flipping axis 136. In one embodiment, the motor 176 is coupled to the shaft 174 through a gear train 177 that includes a gear 178 that is mounted to the shaft 174, as shown in FIG. 3.

One or more sensors (e.g., optical sensor, encoder wheel, etc.) may be used by the controller 106 to determine the angular position of the receptacle 132 about the flipping axis 136 using any suitable technique. For example, when the motor 176 is a stepper motor, one or more sensors may be used by the controller 106 to establish a home angular position of the receptacle 132, and the controller 106 can rotate the receptacle 132 to a desired angular position about the flipping axis 136 by stepping the motor 176 through a predefined number of steps. Other techniques may also be utilized by the controller 106 to move the receptacle 132 to a desired angular position about the flipping axis 136 using the motor 176. Accordingly, the controller 136 may control the motor 176 to drive rotation of the shaft 174 and the attached receptacle 132 from the first angular position 146 (FIG. 4), through an intermediary position (FIG. 5) and to the second angular position 150 (FIG. 6).

As mentioned above, the receptacle 132 may include a card transport having one or more motorized feed rollers, such as feed rollers 142 and 143. In some embodiments, the feed rollers 142 and 143 are supported by the member 166 of the receptacle 132 and are respectively configured to rotate about axes 182 and 183, which are perpendicular to the card feed axis 140, as shown in FIG. 3. In some embodiments, the receptacle 132 includes idler rollers 184 and 186 (FIG. 3), which combine with the feed rollers 142 and 143 to form pinch roller pairs 188 and 190 at the ports 168 and 170.

The rollers 142 and 143 are driven to rotate about their respective axis 182 and 183 by a motor 192. In some embodiments, the motor 192 is supported by the housing 160 of the receptacle 132, such as the second member 166, and rotates about the flipping axis 136 with rotation of the receptacle 132. The motor 192 may be connected to the feed rollers 142 and 143 through a suitable mechanical connection, such as the gear train 194 shown in FIG. 3.

A card 110 is received within the receptacle 132 along the card feed axis 140 by driving the feed rollers 142 and 143 using the motor 192. A suitable sensor 196 (FIG. 3), such as an optical sensor, may be attached to the receptacle 132 and used by the controller 106 to detect when the card 110 is fully received within the interior cavity 172 of the housing 160. When the card 110 is fully received within the receptacle 132, it is supported in the support plane 138 by the pinch rollers 188 and 190, as generally shown in FIG. 1. A flipping operation may then commence, in which the receptacle 132 and the supported card 110 are rotated about the flipping axis 136.

In some embodiments, each flipper module 104 includes a card supply 200 that is configured to hold a stack 202 of cards 110, and a transport mechanism 204 that is configured to feed individual cards 110 from the stack 202 along the feed path 148. The card transport mechanism 204 may include one or more pinch rollers 206 (FIG. 2), or other suitable card feeding mechanisms. In some embodiments, individual cards 110 are fed along the card feed path 148 with the short edge of the card 110 leading, such as indicated in FIG. 2. The flipper 130 is configured to receive individual cards 110 with the short edge leading from the transport mechanism 204 when the receptacle 132 is in the first angular position 146, and discharge individual cards 110 from the receptacle 132 along the input feed path 116 when the receptacle 132 is in the second angular position 150, as generally indicated in FIG. 2. Alternatively, the flipper modules 104 may be configured to feed the individual cards 110 in their long-edge leading orientation, and the flippers 130 may be configured to receive and discharge cards 110 in their long-edge leading orientation.

Figure 9:
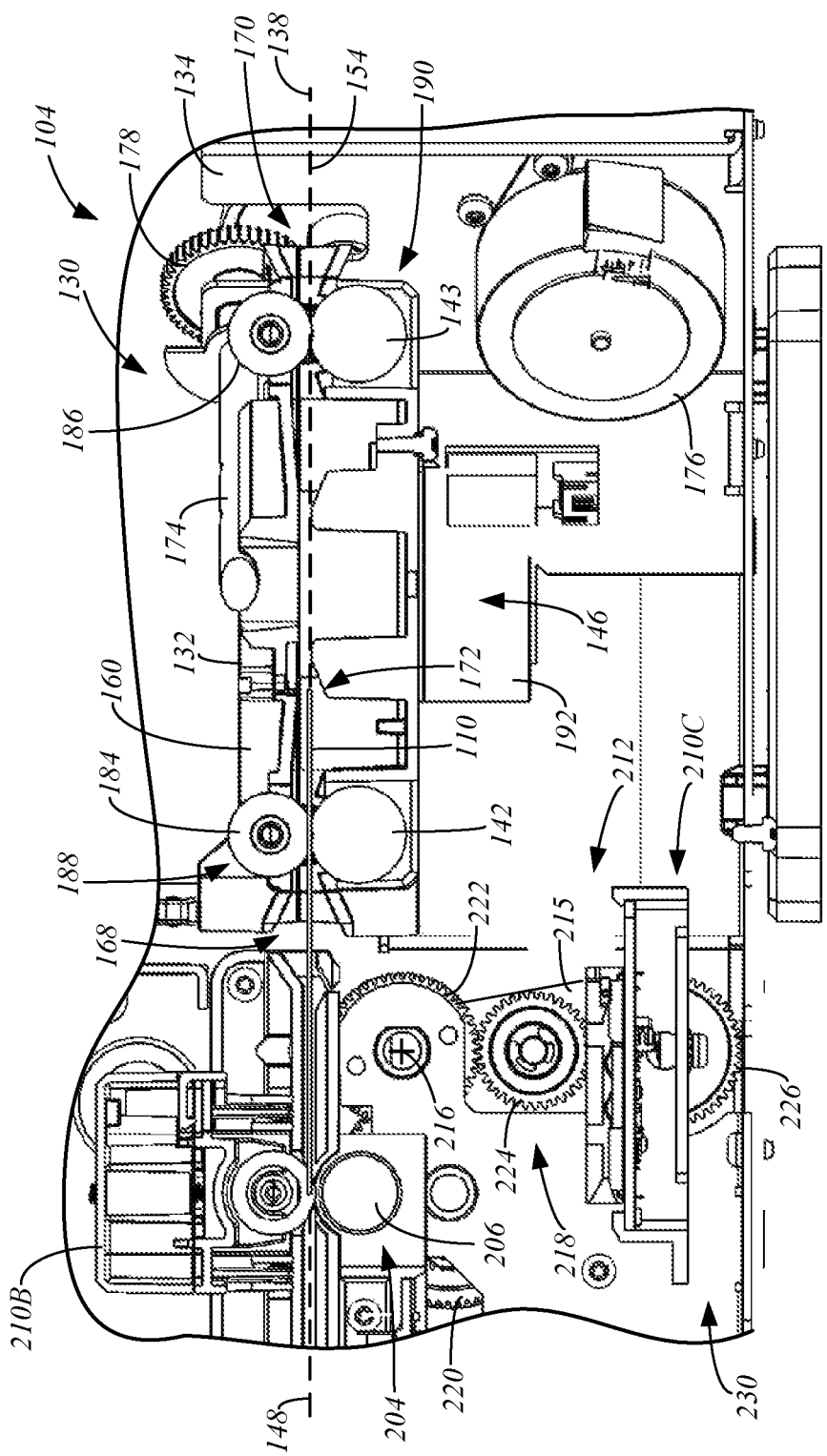
FIG. 9 is a side view of a portion of the flipper module of FIG. 7 during reception of a card in the flipper receptacle.

FIG. 9 is a side view of a portion of the flipper module 104 of FIG. 7 during reception of a card 110 in the flipper receptacle 132. The receptacle 132 is in the first angular position 156 about the flipping axis 136 to position the card feed axis 140 of the flipper 130 in alignment with the feed path 148 of the flipper module 104. In FIG. 9, a pinch roller pair 206 of the card transport mechanism 204 feeds an individual card 110 along the feed path 148 and through the port 168 of the receptacle 132 where the card 110 is fed by the pinch roller pairs 188 and 190 along the feed axis 140 until it is fully received within the receptacle 132. The flipper receptacle 132 may then be rotated about the flipping axis 136 to the second angular position 150, in which the card feed axis 140 is aligned with the input feed path 116 and the input feed path, as generally shown in FIG. 8.

With the flipper receptacle 132 in the second angular position 150 about the flipping axis 136, the flipper 130 is configured to feed the card 110 along the input feed path 116 to the card production device 102, as shown in FIG. 2. When the card flipper module 104 adjoins the card production device 102, such as card flipper module 104C (FIG. 2), the card 110 may be fed directly through the input 112 of the card production device 102 by the flipper 130. However, when the card flipper module 104 does not adjoin the card production device 102, the card flipper module 104 must pass the individual card 110 down the line of flipper modules 104 until the card 110 may be passed to the card production device 102. This passing of the card 110 from one flipper module 104 to the adjoining flipper module 104 requires the flippers 130 of the modules 104 to each be in the second angular position 150 to orient the flippers 130 for receiving and discharging the card 110 along the input feed path 116 toward the card production device 102.

Figure 10:
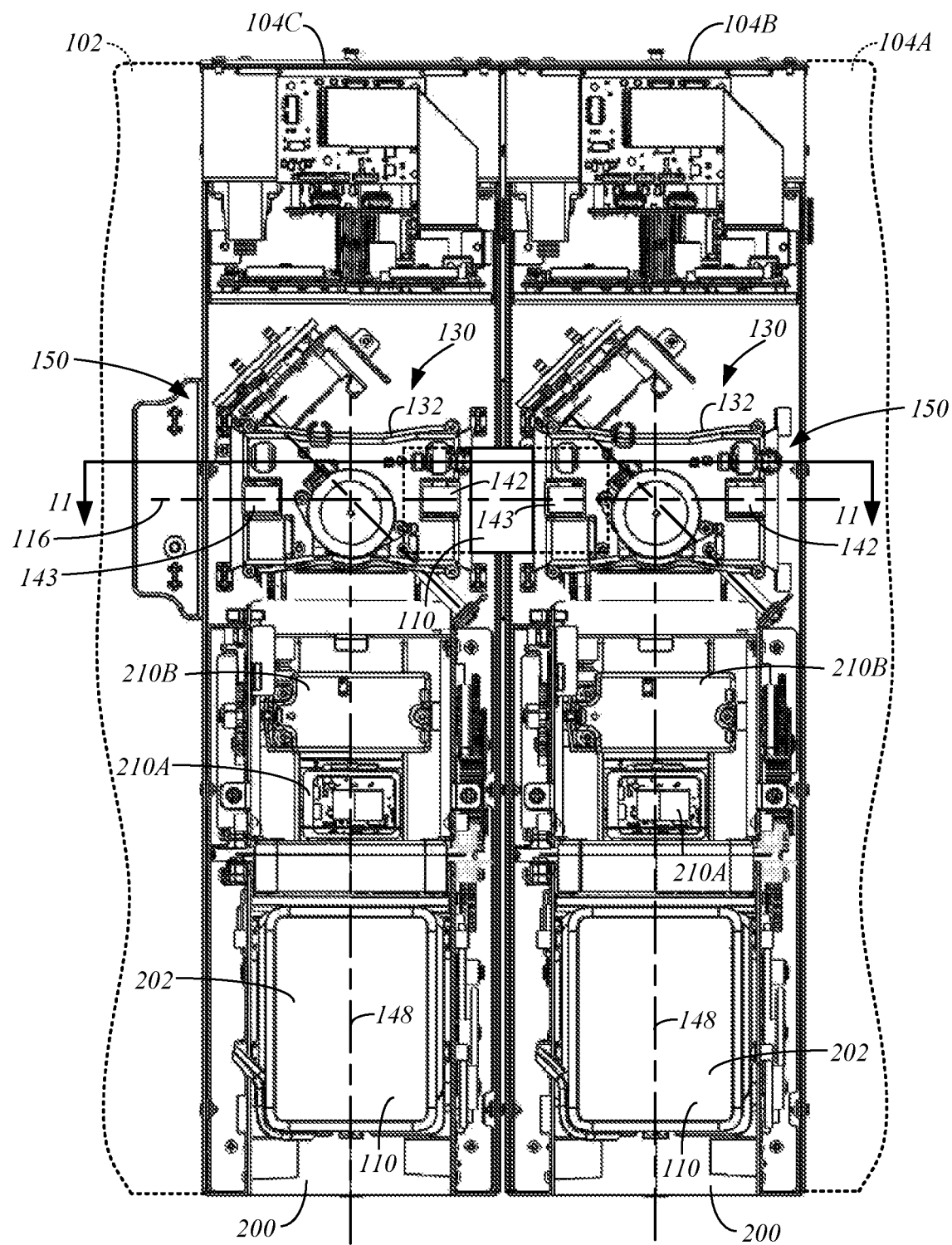
FIGS. 10 and 11 respectively are a top view of a pair of flipper modules in a side-by-side relationship, and a cross-sectional view of FIG. 10 taken generally along line 11-11, in accordance with embodiments of the present disclosure.
Figure 11:
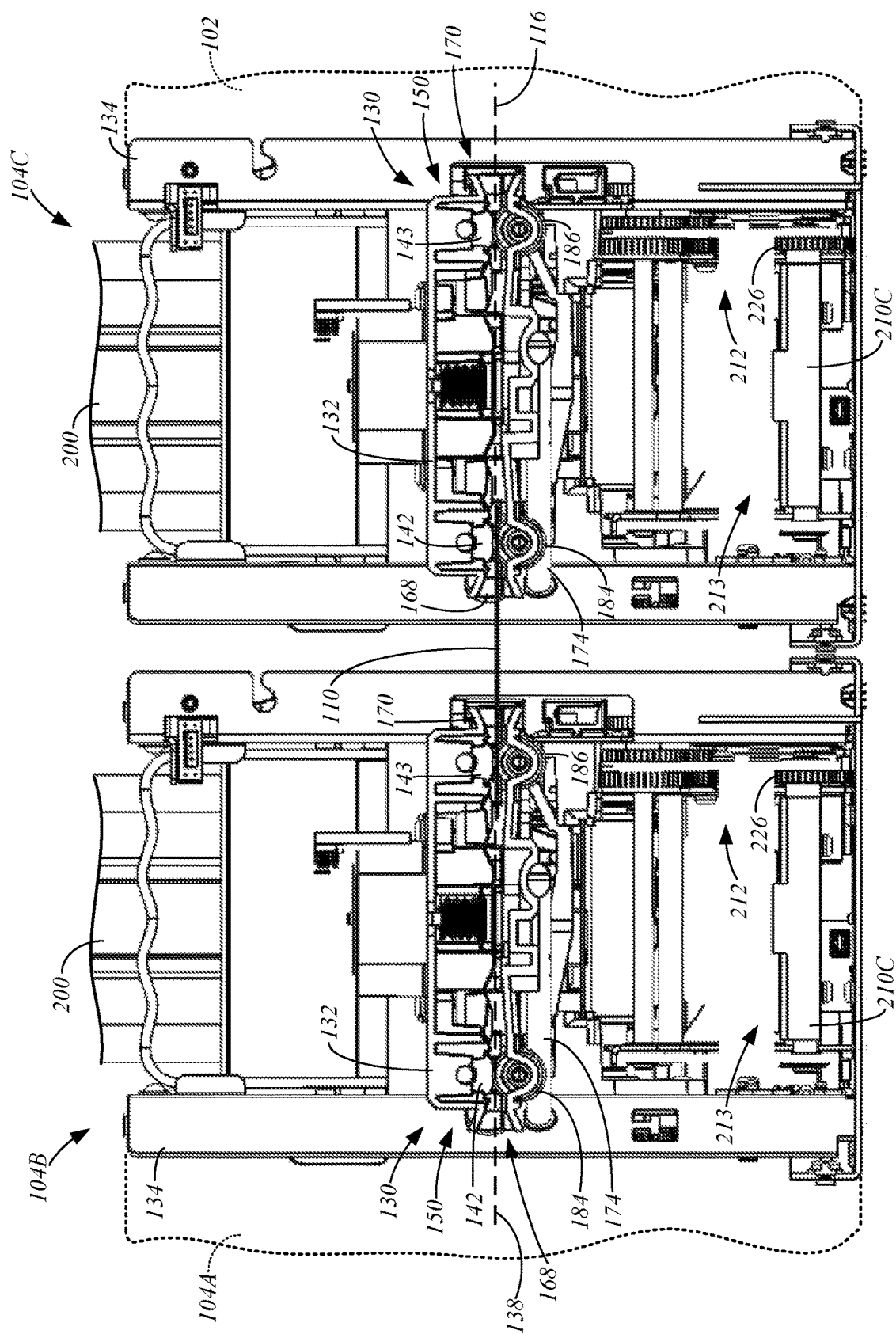

This handoff of cards 110 between the flipper modules 104 is generally illustrated as being performed by the flipper modules 104B and 104C of FIG. 2, and FIGS. 10 and 11, which respectively are a top view of the flipper modules 104B and 104C, and a cross-sectional view of FIG. 10 taken generally along line 11-11. During an exemplary card handoff between the flipper modules 104B and 104C, the flipper receptacles 132 are positioned in the second angular position 150 to align the card feed axes 140 of the receptacles 132 with each other and the input feed path 116. The pinch rollers 184 and 186 of the flipper 130 of the module 104B may be activated to discharge the card 110 through the port 170 and along the card feed axis 140 and the input feed path 116. This drives the leading edge of the card 110 through the port 168 of the receptacle 132 of the module 104C, and the pinch roller pairs 184 and 186 are activated to fully receive the card 110 in the receptacle 132 of the module 104C. The receptacle 132 of the module 104C may then discharge the card 110 through the port 170 of the receptacle 132 and through the input 112 of the card production device 102, which may process the card 110 as described above.

Figure 12:
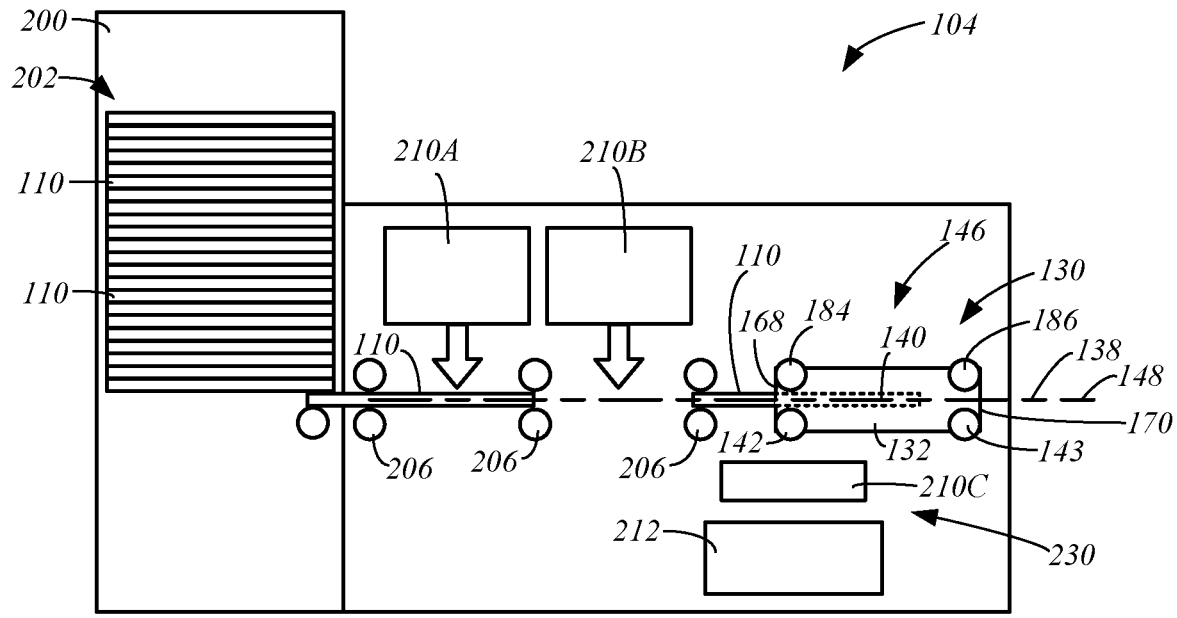
FIGS. 12 and 13 are simplified side views of an exemplary flipper module, in accordance with embodiments of the present disclosure.

The flipper modules 104 may include one or more card processing devices, generally referred to as 210, for performing a process on individual cards 110 fed along the card feed path of the flipper module 104, as shown in FIG. 2. In some embodiments, the one or more processing devices 210 include one or more data encoding devices that are configured to read data from and/or write data to the card 110. Exemplary data encoding devices include a magnetic stripe encoder 210A that is configured to read and/or write data to a magnetic stripe of the card 110, a radio frequency encoder 210B that is configured to wirelessly read and/or write data to the card 110, and a chip contact encoder 210C that is configured to read data from or write data to a chip on the card 110 through engagement with the chip, as shown in FIG. 12, which is a simplified side view of an exemplary flipper module 104 in accordance with embodiments of the present disclosure.

Figure 13:
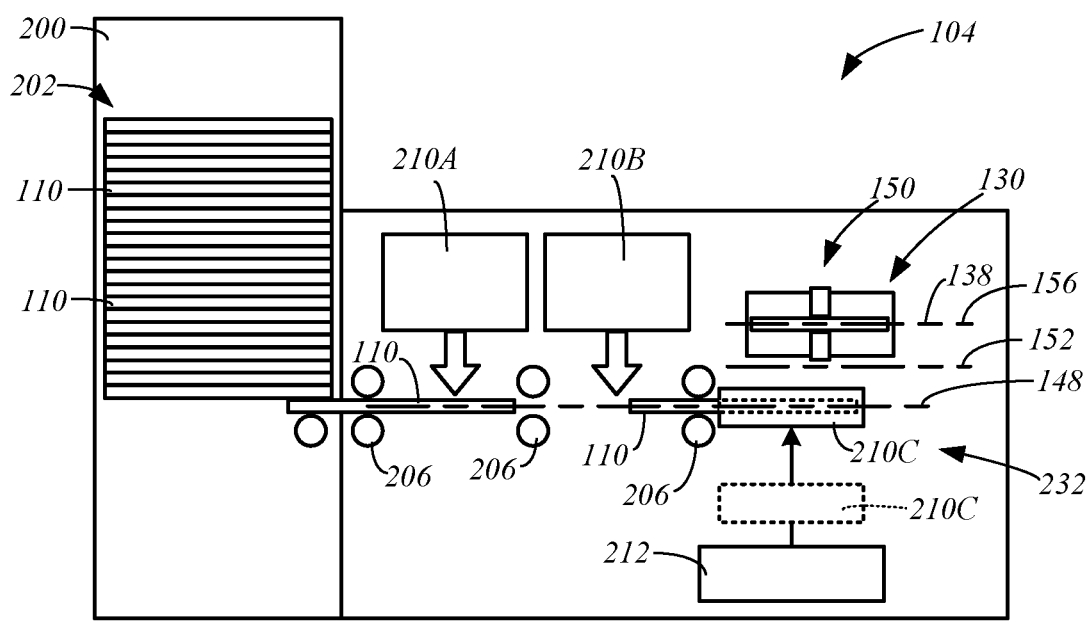

In some embodiments, the flipper module 104 includes a lift mechanism 212 that is configured to move one of the encoding devices 210 relative to the feed path 148 to position the encoding device 210 for an encoding operation on a card 110 fed along the path 148. In some embodiments, the lifting mechanism 212 operates to move the encoding device 210C into at least a portion of the space occupied by the flipper receptacle 132 when it is in the first angular position 146 after the flipper receptacle 132 has been moved to the second angular position 150. This is generally shown in FIG. 13, which is a simplified side view of the exemplary flipper module 104 of FIG. 12 with the contact chip encoder 210C moved by the lift mechanism 212 from a lowered position 230 (FIG. 12) to a raised position 232 (FIG. 13) for encoding a card 110 positioned in the feed plane 154 along the path 148.

The lift mechanism 212 may take on any suitable form. In some embodiments, the lift mechanism 212 includes a frame 215 that supports the chip contact encoder 210C and is configured to pivot about an axis 216, as shown in FIG. 9. In some embodiments, the lift mechanism 212 includes a gear train 218 comprising gears 220, 222, 224 and 226, which are attached to the frame 215. A motor drives rotation of the gear 220, which drives rotation of the gear 220 and the frame 215 about the axis 216. This pivoting of the frame 215 about the axis 216 drives rotation of the gears 224 and 226. The chip contact encoder 210C is configured to rotate with the gear 226 during this pivoting of the frame 215, which generally maintains the chip contact encoder 210C in a horizontal orientation as it is moved from a lowered position 230 shown in FIG. 9, to a raised position 232 shown in FIG. 14.

Figure 14:
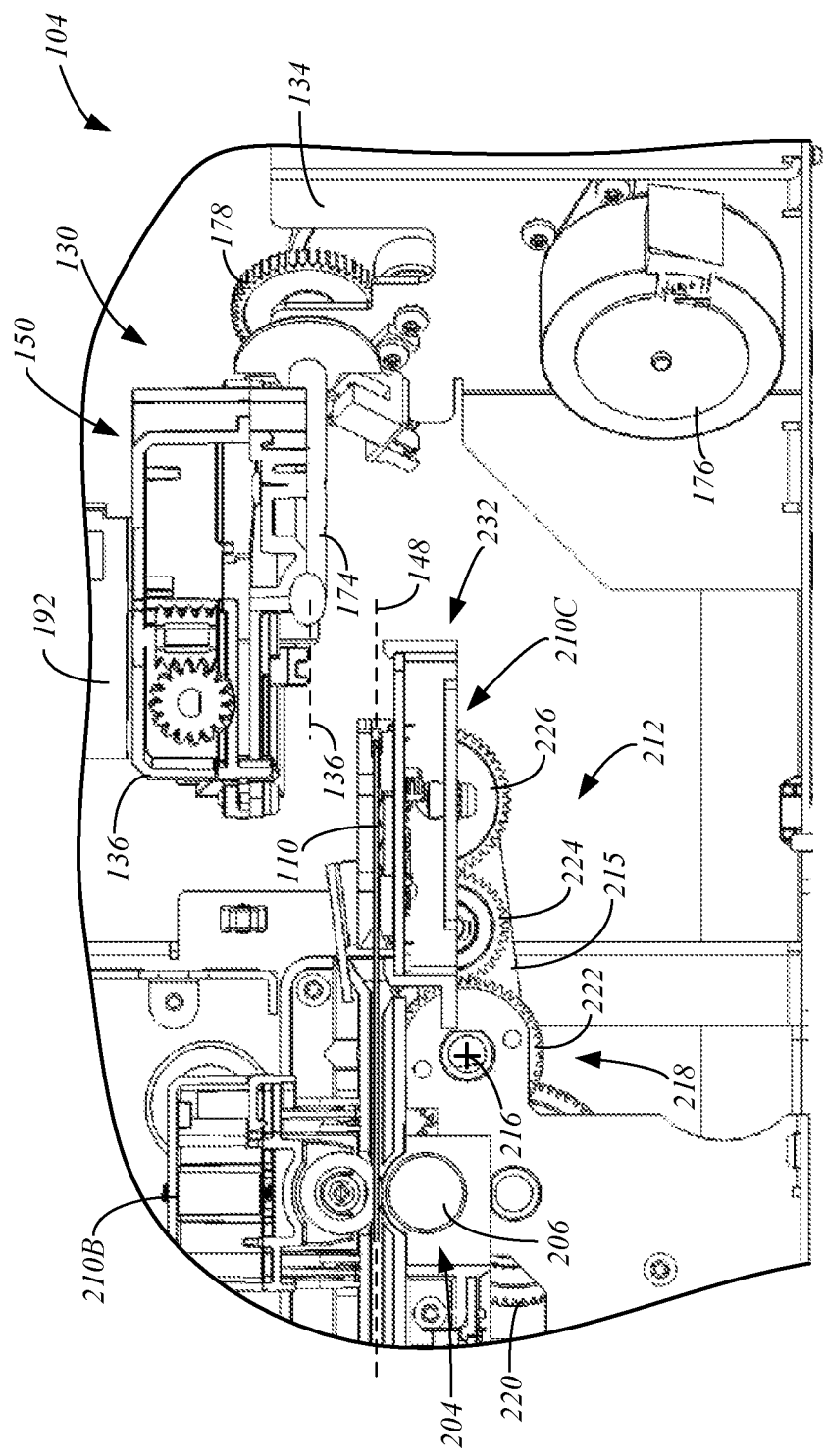
FIG. 14 is the side view of FIG. 9 with an encoding device in a raised position, in accordance with embodiments of the present disclosure.

FIG. 9 shows the chip contact encoder in the lowered position 230 when the flipper receptacle 132 is in the first angular position 146, and FIG. 14 shows the chip contact encoder in the raised position 232 when the flipper receptacle 132 is in the second angular position 150. When in the raised position 232, the chip contact encoder 210C occupies a portion of the space previously occupied by the flipper receptacle 132 when it was in the first angular position 146 (FIG. 9).

With the chip encoder module in the raised position 232, the card transport mechanism 204 of the flipper module 104 may feed a card 110 along the path 148 and into the chip contact encoder 210C for encoding, as shown in FIG. 14. During this card encoding process, the flipper 130 of the flipper module 104 in the second angular position 150 may be used to hand off a card 110 to an adjoining flipper module 104. After encoding the card 110 using the chip contact encoder 210C, the card transport 204 feeds the card 110 along the path 148 and out of the chip contact encoder 210C, and the chip contact encoder 210C is moved to the lowered position 230 (FIGS. 9 and 12) by the lift mechanism 212. The flipper receptacle 132 may then be returned to the first angular position 146 to receive the encoded card 110 (FIGS. 9 and 12) and the flipper receptacle 132 may then be moved to the second angular position 150 to feed the encoded card 110 along the input feed path 116 to the card production device 102.

The encoding of cards is time consuming and generally limits the efficiency at which conventional card production systems can produce card products. One advantage to the system 100, is that the flipper modules 104 are each capable of encoding cards 110 in parallel. That is, each module 104 is capable of feeding a card 110 from its supply 200 and encoding the card 110 independently from the other modules 104, while the card production device 102 is performing one or more processes on previously encoded cards 110.

For example, with reference to FIG. 2, after module 104A completes an encoding operation on a card 110, the card 110 is fed into the flipper 130 in the first angular position 146. The flipper 130 of the module 104A may then rotate to the second angular position 150, which aligns the card 110 for feeding along the input feed path 116. With the flipper of modules 104B and 104C in their second angular positions 150, the substrate 110 may be fed between the flippers 130 of the modules 104A, 104B and 104C along the input feed path 116 to the card production device 102. During this feeding of the card 110 to the card production device 102, the module 104B may perform one or more encoding operations on a card 110 from its supply 200. Similarly, modules 104A and 104C may also perform one or more encoding operations on cards 110 from their supplies 200. This independent processing of cards 110 by the modules 104 eliminates delays caused by encoding processes faced by conventional card production systems, and essentially allows the system 100 to produce card products at a rate that is limited only by the processing of the cards 110 by the card production device 102.

Although the embodiments of the present disclosure have been described with reference to preferred embodiments, workers skilled in the art will recognize that changes may be made in form and detail without departing from the spirit and scope of the present disclosure. It is appreciated that certain features of the present disclosure, which are, for clarity, described in the context of separate embodiments, may also be provided in combination in a single embodiment. Conversely, various features of the present disclosure, which are, for brevity, described in the context of a single embodiment, may also be provided separately or in any suitable subcombination or as suitable in any other described embodiment of the present disclosure. Certain features described in the context of various embodiments are not to be considered essential features of those embodiments, unless the embodiment is inoperative without those elements. As used herein the term "approximately," "about" or "substantially" generally refers to ±5% of the referenced value and denotes equality with a tolerance of at most 5%, unless stated otherwise.

What is claimed is:

1. A card flipper comprising:
   a frame;
   a receptacle supported by the frame for rotation about a flipping axis, the receptacle configured to support a card in a support plane and receive and discharge cards along a card feed axis; and
   a motor configured to drive rotation of the receptacle, the support plane and the card feed axis about the flipping axis;
   wherein the flipping axis is oblique to the card feed axis and is displaced from the support plane.

2. The card flipper of claim 1, wherein the receptacle includes:
   a first angular position about the flipping axis in which the support plane is coplanar to a first feed plane and the card feed axis is substantially parallel to a first feed path; and
   a second angular position about the flipping axis in which the support plane is coplanar to a second feed plane and the card feed axis is substantially parallel to a second feed path that is oblique to the first feed path;
   wherein the first feed plane is displaced from, and approximately parallel to, the second feed plane.

3. The card flipper of claim 2, wherein:
   the flipping axis is oriented at approximately 45 degrees to the card feed axis; and
   the first feed path is approximately perpendicular to the second feed path.

4. The card flipper of claim 3, wherein the first and second angular positions are separated by approximately 180 degrees.

5. The card flipper of claim 2, wherein the receptacle comprises:
   a receptacle frame;
   a first feed roller supported at a first port of the receptacle frame and configured to drive the card along the card feed axis; and
   a second feed roller supported at a second port of the receptacle frame that is displaced along the card feed axis from the first port and configured to drive the card along the card feed axis.

6. The card flipper of claim 5, wherein the receptacle includes a feed motor supported by the receptacle frame and configured to drive rotation of the first and second feed rollers.

7. The card flipper of claim 6, wherein the receptacle comprises:
   a first pinch roller pair including the first feed roller; and
   a second pinch roller pair including the second feed roller;
   wherein the first and second pinch roller pairs are configured to support the card in the support plane.

8. A card flipper module comprising:
   a frame;
   a card supply configured to hold a stack of cards;
   a card flipper comprising:
      a receptacle supported by the frame for rotation about a flipping axis, the receptacle configured to support a card from the card supply in a support plane and receive and discharge cards along a card feed axis; and
      a motor configured to drive rotation of the receptacle, the support plane and the card feed axis about the flipping axis;
      wherein the flipping axis is oblique to the card feed axis and is displaced from the support plane; and
   a card transport configured to feed individual cards from the card supply to the receptacle of the card flipper along a first feed path.

9. The card flipper module of claim 8, wherein the receptacle comprises:
   a first angular position about the flipping axis in which the support plane is approximately coplanar to a first feed plane and the card feed axis is approximately parallel to the first feed path; and
   a second angular position about the flipping axis in which the support plane is approximately coplanar to a second feed plane and the card feed axis is approximately parallel to a second feed path that is oblique to the first feed path;
   wherein the first feed plane is displaced from, and approximately parallel to, the second feed plane.

10. The card flipper module of claim 9, wherein the card transport is configured to feed the individual cards to the receptacle along the first feed plane.

11. The card flipper module of claim 10, further comprising at least one data encoding device selected from the group consisting of a magnetic stripe encoder, a radio frequency encoder, and a chip contact encoder.

12. The card flipper module of claim 10, wherein:
   the flipping axis is oriented at approximately 45 degrees to the card feed axis;
   the first feed path is approximately perpendicular to the second feed path; and
   the first and second angular positions are separated by approximately 180 degrees.

13. The card flipper module of claim 9, wherein the receptacle comprises:

a receptacle frame;
a first feed roller supported at a first port of the receptacle frame and configured to drive the card along the card feed axis;
a second feed roller supported at a second port of the receptacle frame that is displaced along the card feed axis from the first port, and configured to drive the card along the card feed axis; and
a feed motor supported by the receptacle frame and configured to drive rotation of the first and second feed rollers.

14. A card production system comprising:
a processing module comprising:
  at least one processing device selected from the group consisting of a print unit configured to print an image on a card, a laminating unit configured to apply an overlaminate to a card, and a laser engraving unit configured to engrave a card; and
  a card input configured to receive individual cards for processing by the at least one processing device along an input feed path; and
first and second card flipper modules each comprising:
  a frame;
  a card supply configured to hold a stack of cards;
  a transport configured to feed individual cards from the card supply along a transport feed path, which is oblique to the input feed path; and
  a flipper configured to receive a card from the individual cards of the card supply fed along the transport feed path, invert the card and discharge the card along the input feed path to the processing module, the flipper comprising:
    a receptacle supported by the frame for rotation about a flipping axis, the receptacle configured to support the card in a support plane and receive and discharge cards along a card feed axis; and
    a motor configured to drive rotation of the receptacle, the support plane and the card feed axis about the flipping axis, which is oblique to the card feed axis and is displaced from the support plane;
wherein:
  the first card flipper module is between the processing module and the second card flipper module; and
  the flipper of the second card flipper module is configured to discharge cards to the flipper of the first flipper module.

15. The card production device of claim 14, wherein each receptacle includes:
a first angular position about the flipping axis in which the support plane is coplanar to a first feed plane and the receptacle is configured to receive cards fed along a corresponding transport feed path; and
a second angular position about the flipping axis in which the support plane is coplanar to a second feed plane and the receptacle is configured to discharge cards along the input feed path.

16. The card production device of claim 15, wherein:
the flipping axis of each of the first and second card flipper modules is oriented at approximately 45 degrees to the corresponding card feed axis; and
the transport feed paths are approximately perpendicular to the input feed path.

17. The card production device of claim 16, wherein:
the first and second angular positions are separated by approximately 180 degrees; and
the first feed plane is displaced from, and approximately parallel to, the second feed plane.

18. The card production device of claim 15, wherein each receptacle comprises:
a receptacle frame;
a first feed roller supported at a first port of the receptacle frame and configured to drive a card along the card feed axis;
a second feed roller supported at a second port of the receptacle frame that is displaced along the card feed axis from the first port and configured to drive a card along the card feed axis; and
a feed motor supported by the receptacle frame and configured to drive rotation of the first and second feed rollers.

19. The card production device of claim 14, wherein the first and second card flipper modules each comprise at least one data encoding device selected from the group consisting of a magnetic stripe encoder, a radio frequency encoder, and a chip contact encoder.

* * * * *